March 9, 1937.    G. S. ALLIN    2,072,998
LOAD HAULING VEHICLE
Filed May 3, 1935    6 Sheets-Sheet 1
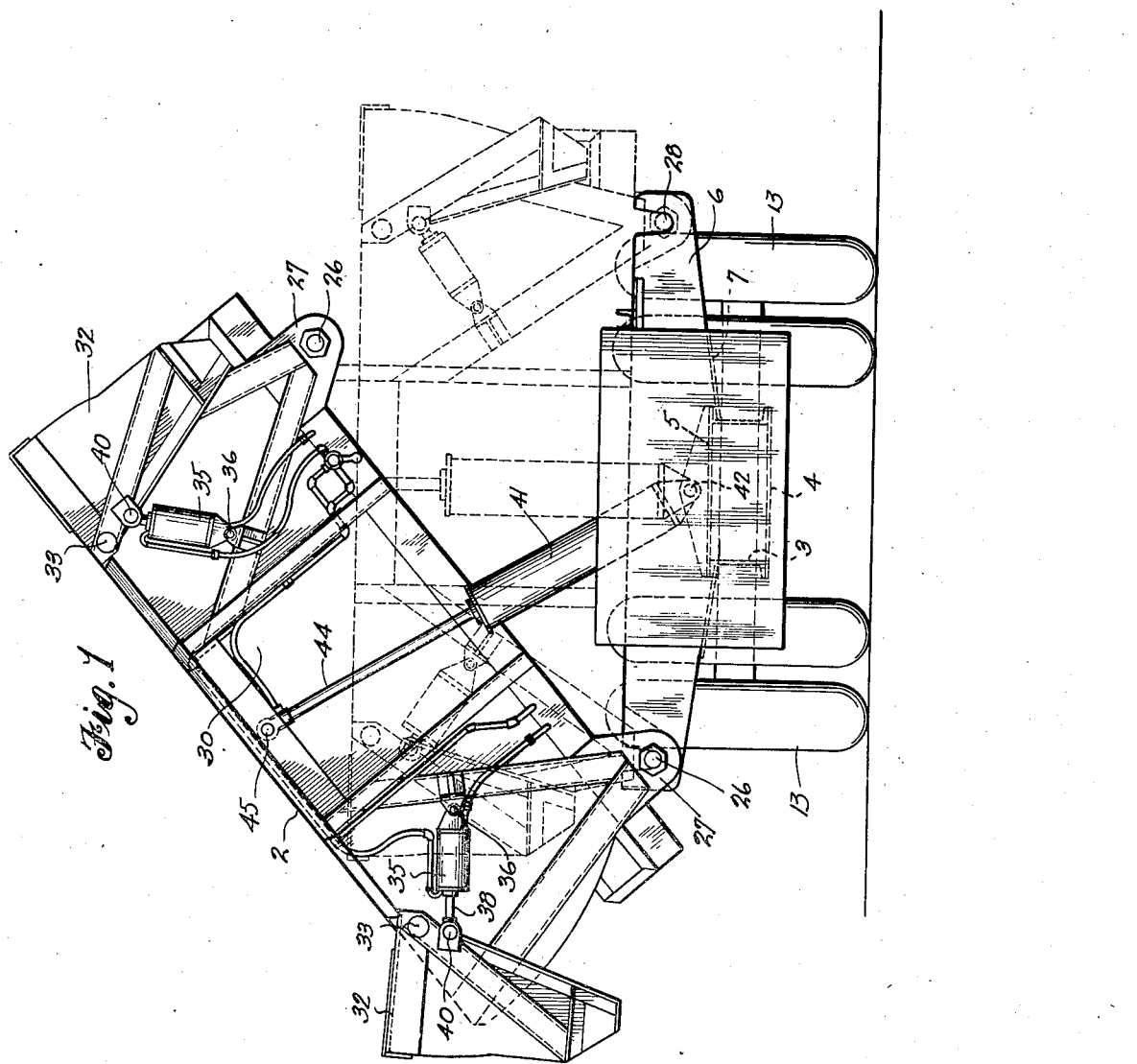
INVENTOR
GEORGE S. ALLIN
BY
ATTORNEY

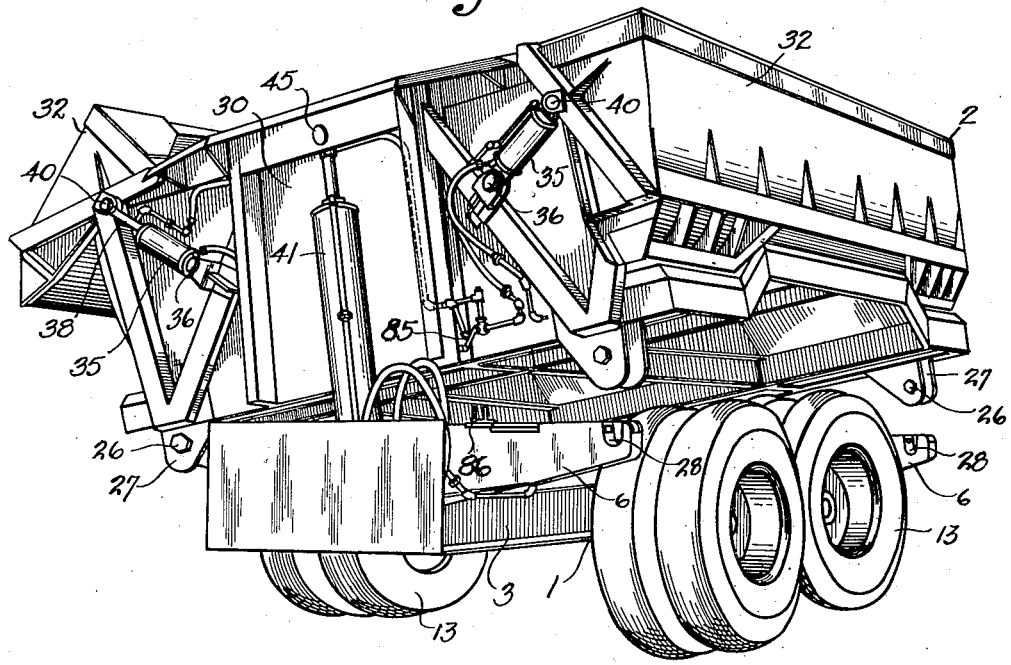
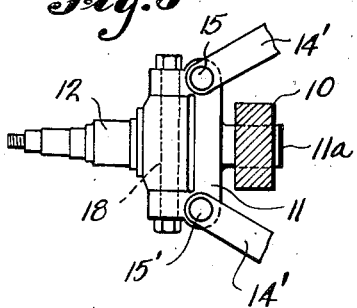
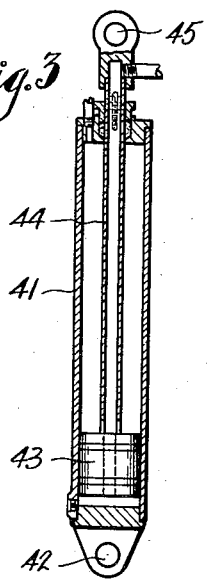
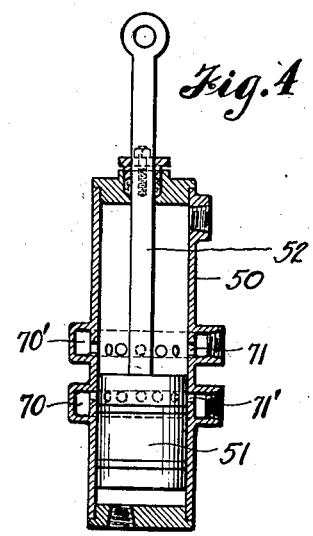

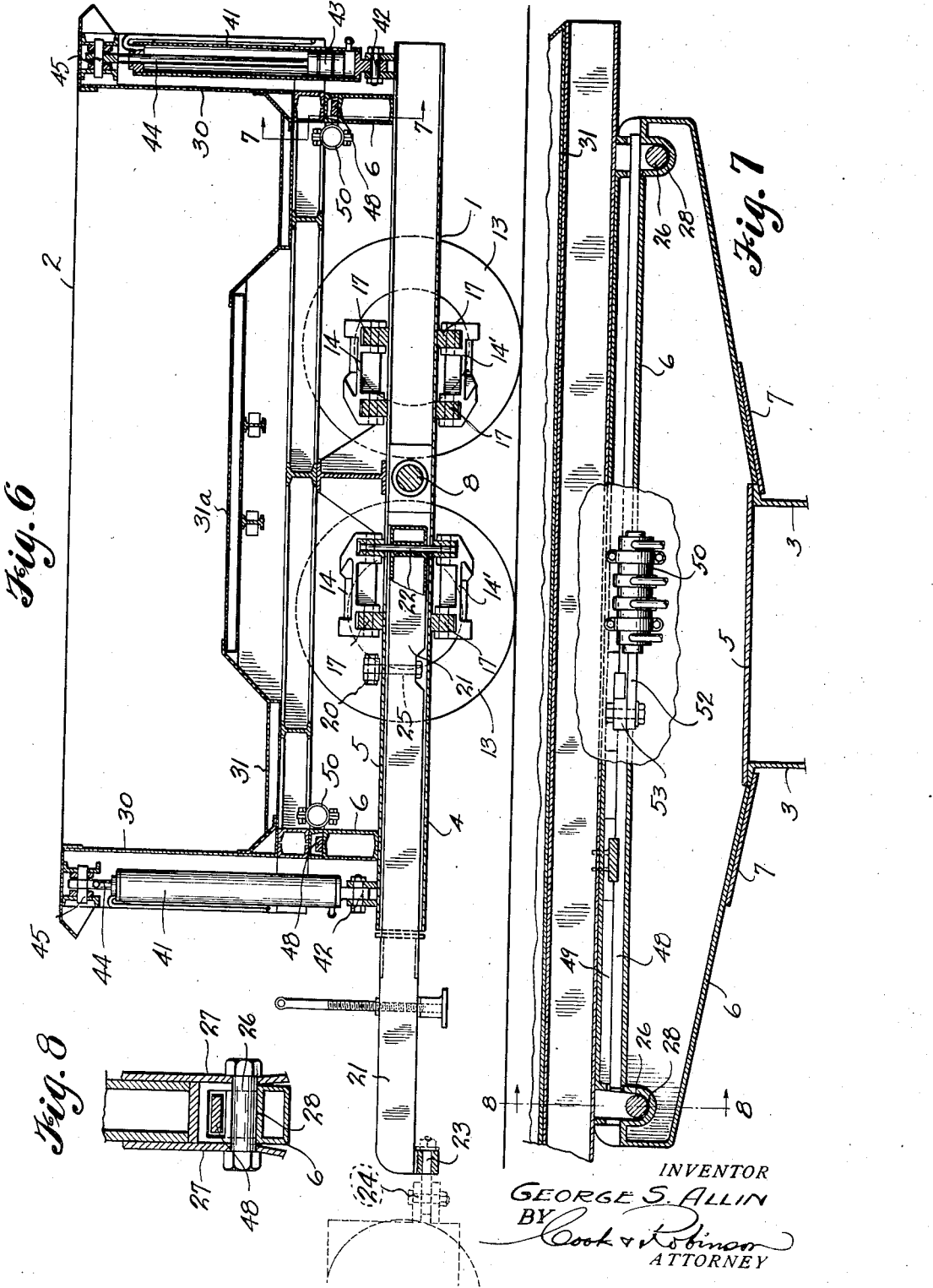

March 9, 1937.　　　　G. S. ALLIN　　　　2,072,998
LOAD HAULING VEHICLE
Filed May 3, 1935　　　　6 Sheets-Sheet 4
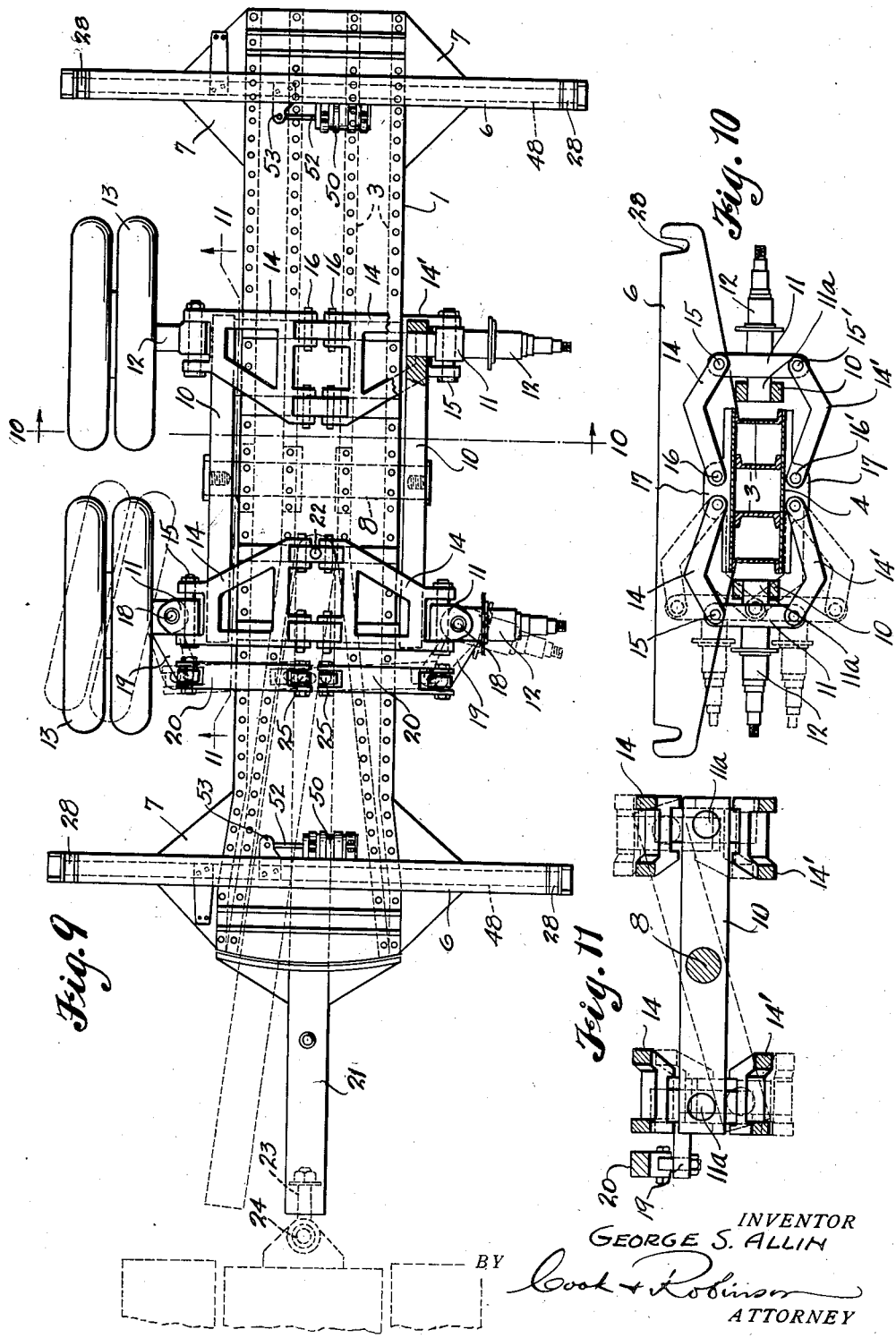
INVENTOR
GEORGE S. ALLIN
BY Cook + Robinson
ATTORNEY

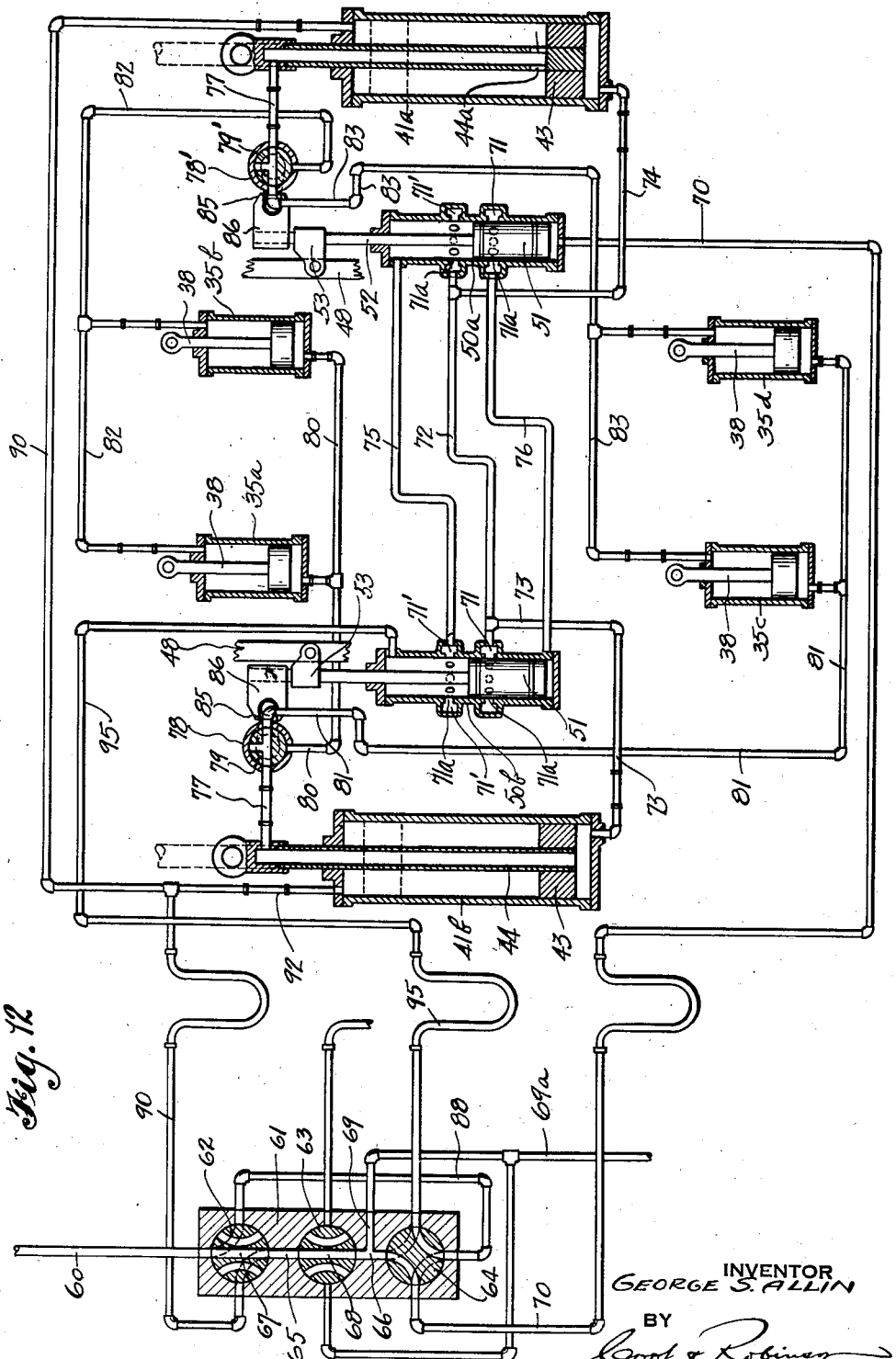

March 9, 1937.　　　　G. S. ALLIN　　　　2,072,998
LOAD HAULING VEHICLE
Filed May 3, 1935　　　　6 Sheets-Sheet 6
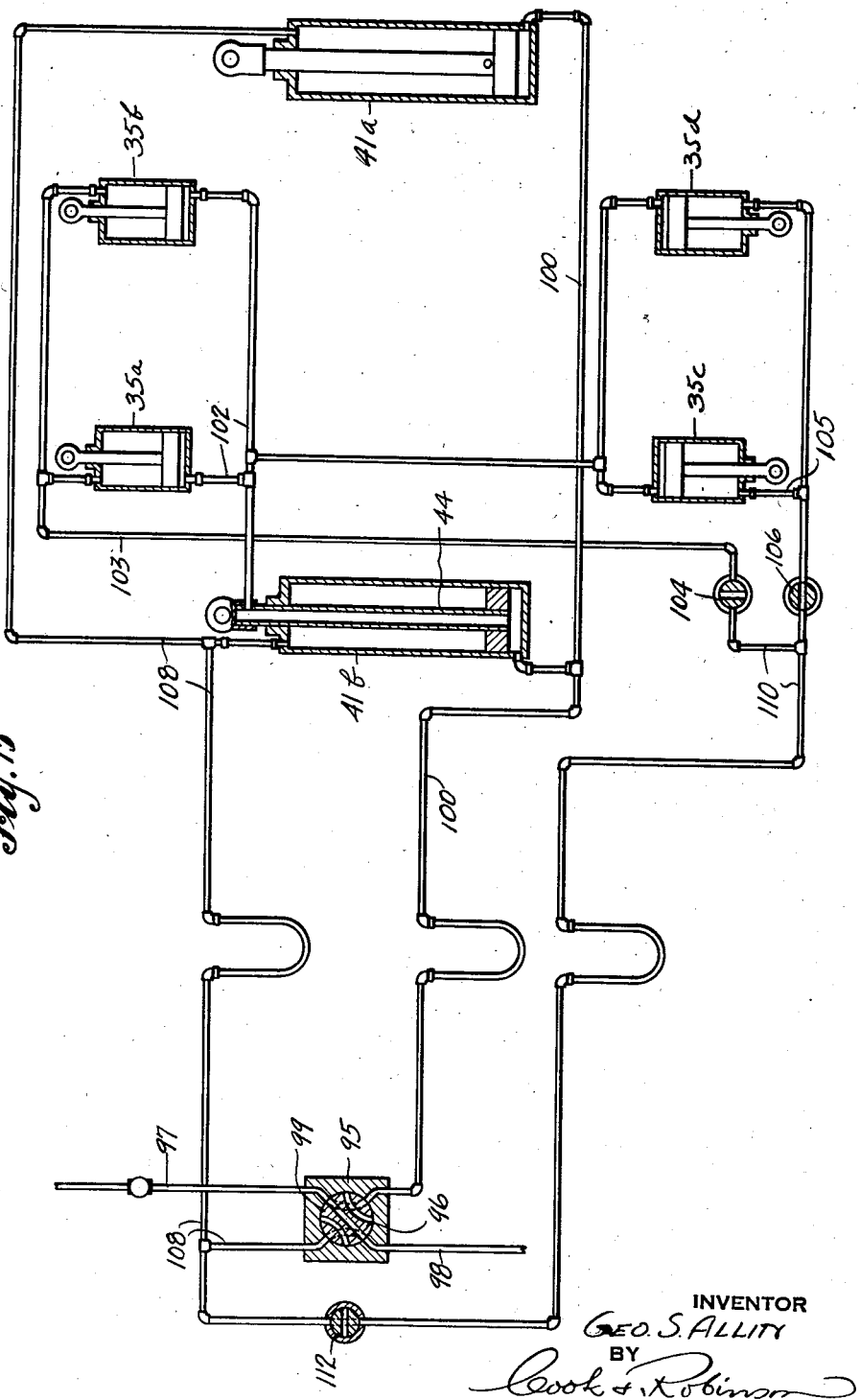

Patented Mar. 9, 1937

2,072,998

UNITED STATES PATENT OFFICE 2,072,998

LOAD HAULING VEHICLE

George S. Allin, Seattle, Wash., assignor to Isaacson Iron Works, Inc., Seattle, Wash.

Application May 3, 1935, Serial No. 19,578

5 Claims. (Cl. 298—18)

This invention relates to improvements in load hauling vehicles and it has reference in particular to dump body vehicles designed for the hauling of dirt, gravel, and the like; it being the principal object of this invention to provide a vehicle having a body designed for carrying a load of great weight and volume and for dumping its load toward either side of the vehicle, and having gates arranged at the sides of the body and equipped with power control means for moving them between open and closed positions in conjunction with power means for dumping the body.

It is also an object of this invention to provide a vehicle of the kind above stated wherein the body has supports at its opposite sides on which it pivots for dumping, and wherein locking devices are arranged to selectively lock the pivot supports at either side in their seats while those at the opposite side are freed thus to permit dumping of the load toward the side at which the pivots are locked in their seats.

It is a further object of the invention to provide hydraulic cylinder mechanism and controls of novel arrangement for tilting the body for dumping the load toward either side, and other hydraulic cylinders for selectively actuating the gates. Also, it is an object to so connect these hydraulic systems for control of the body and gates that they may operate conjointly and automatically in a predetermined sequence.

Still another object of the invention is to provide a draft and balance beam through which steering of certain ground wheels of the vehicle is effected to facilitate travel.

Other objects of the invention reside in the details of construction of the chassis, particularly with reference to a tandem truck arrangement and wheel mountings which provide for "knee action" of the various wheels and a compensating action of the tandem trucks.

Other objects of the invention are to be found in the details of construction; in the combination of parts and in their mode of operation, as will hereinafter be fully described.

In accomplishing these and other objects of the invention, I have provided the details of construction, the preferred forms of which are illustrated in accompanying drawings, wherein—

Fig. 1 is an end view of the vehicle, showing the body tilted to dumping position.

Fig. 2 is a perspective view of the vehicle from the rear end, the body just slightly tilted toward dumping position.

Fig. 3 is a longitudinal, sectional view of one of the hydraulic cylinders used to tilt the body for dumping.

Fig. 4 is a sectional view of one of the hydraulic cylinders used for shifting a lock bar.

Fig. 5 is a detail of one of the steering wheel mounting spindles.

Fig. 6 is a central, longitudinal section of the vehicle.

Fig. 7 is an enlarged cross section on line 7—7 in Fig. 6, illustrating the position of the lock bar at that end of the chassis.

Fig. 8 is a cross sectional detail, on the line 8—8 in Fig. 7.

Fig. 9 is a plan view of the chassis.

Fig. 10 is a sectional detail on line 10—10 in Fig. 9.

Fig. 11 is a cross section on line 11—11 in Fig. 9.

Fig. 12 is a diagram of a piping system for control of the hydraulic systems.

Fig. 13 is a diagram of a piping system of an alternative form.

Referring more in detail to the drawings—

In its preferred form of construction, the vehicle comprises a wheel supported chassis 1 with a body 2 for carrying a load, mounted thereon and adapted for dumping the load toward either side. As seen best in Figs. 9 and 10, the chassis comprises a frame structure made up of a plurality of longitudinally extending and spaced apart channel beams 3, secured together by plates 4 and 5 which, respectively, underlie and overlie the beams and are securely riveted thereto.

At the forward and rearward ends of the chassis, respectively, are transverse bunks 6—6 which are securely fixed in place on the beams and are additionally braced by fish plates 7, as seen in Fig. 9. The opposite ends of the bunks extend equally beyond opposite sides of the frame and are the means of support for the dump body, as will later be described.

Approximately at the medial point of the chassis, is a supporting cross shaft 8 which extends through the beams 3 transversely of the frame with its opposite ends projecting somewhat beyond the sides of the frame as supporting trunnions on which beams 10—10, extending in the longitudinal direction of the chassis, are pivotally mounted. The beams 10—10 are of equal length and are pivoted at the centers to oscillate in parallel, vertical planes. Pivotally mounted at the opposite ends of each of these beams 10—10 are wheel mounting knuckles 11, each provided with a horizontal, outwardly extending spindle 12 on which a ground wheel, or wheels, 13 are mounted for support of the vehicle.

By reference to Figs. 9 and 11, it will be observed that the knuckles 11 have inside journals 11a revoluble in bearings in the ends of the beams 10. Also it is observed that associated with each knuckle is a pair of hinge brackets 14—14' with ends pivotally connected by pivot pins 15—15', respectively, with the upper and lower ends of the knuckles and with their other ends pivotally connected by pins 16—16' to lugs 17 on top and bottom sides of the chassis, thereby providing a tandem wheel arrangement in which the wheels have knee action compensated through the pivotal action of the beams 10—10 and wherein the beams are relieved of all possible lateral strain. It will be apparent that the tandem wheels at one side are movable vertically up or down independent of those at the other side and that the wheels in tandem at each side have a relative compensating action through the pivoting of their mounting lever 10.

The paired hinge brackets 14—14' for each knuckle have a parallel link action whereby the wheel spindles are always maintained in normal horizontal positions in the upward or downward knee action movements. The knuckle mounting journals 11a are rotatable and also slidable in an axial direction in their bearings in the ends of beams 10. Also, the knuckles have clearance between the hinge lugs at the ends of the brackets 14 to provide for slight forward and rearward sliding on the pivot pins 15—15' that is incident to the oscillating action of the levers 10.

The spindles for the forward sets of wheels are pivotally mounted in their knuckles by vertical pins 18 as shown in Figs. 5 and 9 and they have steering arms 19 extended forwardly therefrom and operatively connected by links 20 with a balance and draw bar through the mediacy of which the vehicle is drawn; this bar 21 having its rearward end pivotally attached to the chassis frame structure just forwardly of the cross shaft 8 by a vertical pin 22 with its forward end extended forwardly of the frame and is equipped at its forward end with a supporting and hauling connection, as at 23 in Figs. 6 and 9, with a tractor draft connection designated at 24. The draft bar 21 is horizontally swingable about its pivot pin connector 22 toward opposite sides of the vehicle within a limited angle between longitudinal frame beams as designated in dotted lines in Fig. 9, and this movement effects the steering action of the forward wheels 13.

The connecting links 20 have universal, pivotal connections at their outer ends with the steering arms 19 and they likewise have universal, pivotal connection at their inner ends with pins or bolts 25 extended upwardly through the draft bar, thereby to accommodate themselves to the knee action movements of the steering wheels. It will be observed also by reference to Fig. 9 that these pivotal connections are alined with the line of pivots of the knuckle mounting links, thereby providing that the knee action movement will not effect change in steering direction.

The body of the vehicle is supported for its load dumping action upon the cross bunks 6 and 6. The supporting pivots are located substantially at the four corners of the body and each comprises a bolt 26 that extends between spaced, depending flanges 27—27 at a corner of the body. These bolts, as seen best in Figs. 7 and 8 are adapted to rest pivotally in seats 28 provided therefor across the outer ends of the bunks. When the body is in lowered position, all four of the pivotal supports rest in their respective seats and when it is desired to dump a load to either side, the body is caused to pivot in the supports at that side while the supports at the other side are permitted to leave their seats; this action being illustrated in Figs. 1 and 2.

The load hauling body is of rectangular form having opposite end wall 30—30, a bottom wall 31, with a raised central portion 31a for wheel clearance, as seen in Fig. 6. The body is open at its opposite sides and each is equipped with a swinging gate 32 that is pivotally mounted by bolts 33 to permit it to swing outwardly away from the body along its lower edge, as is illustrated at the right hand side in Fig. 1.

Each gate is actuated between open and closed positions by hydraulic hoists located at opposite ends of the gate; each hoist comprising a closed cylinder 35 pivotally mounted at its lower end, as at 36, on the end wall structure of the body and having a piston 37 movable therein with a piston rod 38 pivotally attached at its outer end, as at 40, to an end frame member of the gate. The arrangement is such that a fluid pressure medium admitted into the inner ends of the cylinders 35 will cause the piston rods to be extended, thereby to open the gate. Likewise, admittance of the pressure medium into the outer ends of the cylinders will effect the closing of the gate, it being understood that when the pressure medium is applied into one end of a cylinder, it is discharged from the opposite end with the piston movement.

Dumping of the body is effected by means of hydraulic hoists located at opposite ends of the body. Each hoist comprises a closed cylinder 41 that is pivotally mounted at its lower end, by a pivot bolt 42, on the chassis frame in its central longitudinal line, as seen in Figs. 1 and 6. In each cylinder 41 is a piston 43 having a piston rod 44 extended from the upper end of the cylinder and pivotally attached by a bolt 45 to the end wall structure at the upper edge and centrally of the body. This arrangement provides that admittance of hydraulic pressure medium into the lower ends of the cylinders 41 will cause the extension of the piston rods therefrom and the lifting of the body to a dumping position, inclined to one side or the other, depending upon which side of the body is freed from the supporting bunks, as will now be explained.

In order to govern the direction of dumping, it is provided that the supporting pivots at one side of the body may be locked against lifting from their seats and those at the other side may be freed. For this purpose there is arranged in each bunk a slidably mounted lock bar 48. Each bar, as seen in Fig. 7, is contained in a guideway 49 in which it is longitudinally shiftable so that a selected end thereof may be extended through the side walls of the seat in which the body supporting pivot bolt rests while its opposite end is drawn clear of the corresponding seat of the bunk. Thus by shifting the two bars to the same side, both pivots at that side will be locked against displacement from their seat and both pivots at the other side will be freed; it being understood that when the bars are extended at either end through the seats, they overlie the pivot bolts, as shown at the right hand end of Fig. 7.

The means provided for shifting the sliding lock bars 48 as shown in Fig. 9, comprises a hydraulic jack for each bar, each jack comprising a closed hydraulic cylinder 50 fixed to the adjacent bunk 6 and having a piston 51 with a piston rod 52 connected at its outer end to a bracket 53 on the lock bar. Application of a hydraulic cylinder 50 will effect a lengthwise movement of its bar 48 to lock the pivots at the side toward which the bar moves and release the pivots at the opposite side.

In Fig. 12 there is diagrammatically illustrated a piping system for the hydraulic devices for actuating the lock bars, for dumping the body and for opening the gates. For purpose of better explanation, the hydraulic cylinders for dumping, located at opposite ends of the body, are designated by reference numerals 41a and 41b; the two hydraulic cylinders for actuating the lock bars 48 are designated by numerals 50a and 50b; the hydraulic cylinders at one side of the body for actuating the gate at that side are designated by numerals 35a and 35b while those at the opposite side are designated by 35c and 35d.

A supply of hydraulic pressure medium is delivered by suitable means, such as a pump, not shown, through a pipe 60 into a valve housing 61 in which valves 62, 63 and 64 are fitted. The pipe 60 leads directly to valve 62 and there is a passage 65 between valves 62 and 63 and a passage 66 between valves 63 and 64, also, the valves 62 and 63 have diametric channels 67 and 68 respectively, adapted to be aligned with the channels 65 and 66 thereby to provide direct communication between pipe 60 and valve 64. A channel 69 leads laterally from the channel 66 and connects with a return pipe 69a for return of the pressure medium to the source of supply.

The valve 64 is a four-way valve and from one side of this valve there leads a pipe 70 having connection with the lower end of the cylinder 50a whereby the lock bar 48 at that end of the body is actuated. It will here be mentioned that the cylinders 50a and 50b in Fig. 12, are each provided about their medial portions with encircling channels 71 and 71' which have communicating parts 71a opening into the cylinders. The pistons 51, in moving from one end of their cylinder to the other, operate to close the ports 71a to one channel and uncover those to the other. It is also observed by reference to Fig. 12 that a pipe 72 connects the channel 71 of cylinder 50b with the channel 71' of the cylinder 50a, and that from this pipe 72, pipes 73 and 74 lead into the lower ends of the dump cylinders 41a—41b at opposite ends of the body. A pipe 75 connects the channel 71' of cylinder 50b with the upper end of cylinder 50a opposite pipe connection 70 and a pipe 76 connects the channel 71 of cylinder 50a with the lower end of cylinder 50b.

These pipe connections provide that the pressure medium admitted through pipe 70 to the lower end of cylinder 50a will actuate the piston 51 upwardly, thereby to uncover ports 71a into channel 71 and allow passage of the pressure medium to cylinder 50b through pipe 76 to push its piston upwardly to thereby uncover its ports 71a into channel 71 and thus provide for flow of the pressure medium through pipe 72, and pipes 73 and 74 into the lower ends of cylinders 41a and 41b.

It will be observed by reference to Fig. 12 that the piston rods 44 of cylinders 41a and 41b are longitudinally channeled and that of cylinder 41b opens to the under side of the piston while that of cylinder 41a has a lateral port 44a opening to the top side of the piston. Also, the upper ends of these piston rods have flexible pipe connections 77 with valve housings 78 and 78' respectively containing three-way valves 79 and 79'. The valve housing 78 has a pipe connection 80 leading into the lower ends of the gate actuating cylinders 35a and 35b, and it has another connection 81 leading into the lower ends of the cylinders 35c and 35d at the opposite side of the body. The valve housing 78', likewise, has pipe connections 82 and 83 leading respectively into the upper ends of the gate actuating cylinders 35a—35b and 35c—35d. The valves 79 and 79' are actuated respectively under control of the lock bars 48 at opposite ends of the body and it is so arranged that the shifting of the bars 48 to one side for locking the body pivots in their seats at that side, will rotate the valves 79 and 79' to such position that pressure medium will be admitted only into the gate actuating cylinders on that side toward which dumping is to take place.

To provide for this control of the valves 79—79', each has a lever arm 85 arranged to seat in a yoke member 86 fixed on the bar 48 at the corresponding end of the vehicle, so that when the bar shifts from one extreme to the other, it rotates its valve one-fourth turn, thus to adjust the valve for a desired directional flow of the pressure medium.

Valve 63 in the present instance is for brake control and its use is not explained in this application.

Assuming that valve 64 should be set in a neutral position, and that valves 62 and 63 should be as shown in Fig. 12, then the pressure medium would be circulated, under action of the pump, not shown, through the valves 62, and 63, and channel 69 to relief. Should it be desired to dump the body, for instance, toward the side mounting the cylinders 35a—35b, the valves 62 and 64 would be adjusted to the positions shown in dotted lines in Fig. 12. Then the pressure medium would flow successively through the pipe 88, valve 64, pipe 70 to cylinder 50, thereby moving piston 51 to its opposite limit, and in this way, move lock bar 48 to lock the corresponding body pivot in its seat at the dumping side and release the opposite pivot. The pressure medium then flows through pipe 76 to cylinder 50b and actuates piston 51 therein to shift the lock bar 48 at that side and also to uncover ports 71a to pipe 72 and thus provide for flow of the pressure medium through pipes 73 and 74 to the dumping cylinders 41a and 41b.

Since the weight of the load usually is greater than the weight of the gates, the pressure medium will, at first, flow out through the hollow piston rod in cylinder 41b without lifting the piston and by reason of the setting of valve 79 due to action of bar 48 will then be directed into pipe 80 to actuate the pistons of cylinders 35a—35b outwardly, thus to open the gate at the dumping side. The pressure medium then backs up in the pipe connection and effects an outward movement of the pistons in the dumping cylinders, thus to dump the load.

As the pistons in cylinders 35a and 35b move upwardly, the pressure medium escapes from their top sides through pipe 82, valve 79' and pipe 77, piston rod 44 of cylinder 41a and then through a return pipe 90 leading from the upper end of cylinder 41a back to valve 62 and then through channel 65, valve 63 and channel 69 to relief pipe 69a. A pipe connection 92 from the upper end of cylinder 41b, into pipe 90, takes care of the return from this cylinder.

If it is desired to dump the body in the opposite direction, valve 62 is adjusted to the dotted line position and valve 64 to the position shown in full lines in Fig. 12. Then the direct flow of the pressure medium is from valve 64 through a pipe 95 leading to the upper end of cylinder 50b. If the pistons 51 of cylinders 41a—41b should be in the positions shown, the pressure medium then flows into pipe 75, through cylinder 50a to pipe 72 and to the dumping cylinders; if the pistons should be at the ends of the cylinders opposite those where shown, then they will be actuated by this admittance of pressure and will shift the lock bars 48 accordingly. It is to be understood that the operation of dumping is the same for one side as the other.

In Fig. 13 is illustrated a simplified piping system. This contemplates manual actuation of the lock bars 48—48 and not an automatic operation.

In this diagram, 95 is a valve housing enclosing a four-way valve 96. The supply pipe for pressure medium is designated at 97 and the relief pipe at 98. The valve is a four-way valve with a diametric channel 99 by which connection may be made between the supply and relief outlets. A pipe line 100 leads from the valve to the lower ends of dumping cylinders 41a—41b. The upper end of the hollow piston rod of cylinder 41b is connected by pipe system 102 with the lower ends of all gate dumping cylinders. The outer ends of cylinders 35a and 35b are connected by pipe system 103 with valve 104. Likewise, the outer ends of cylinders 35c and 35d are connected by a pipe system 105 with a valve 106. The outer ends of the cylinders 41a and 41b are connected by a pipe system 108 with valve housing 95 and valves 104 and 106 are connected to the valve by a pipe 110 with the pipe 108, and the pipe system 110 includes a control valve 112 therein.

In use, either valve 104 or 106 is opened, thereby to control the direction of dumping. If it is desired to dump from the gate controlled by cylinders 35a—35b, then the valve 104 is opened and valve 106 is closed. Then, with valve 112 closed, valve 96 is adjusted to its dotted line position and the pressure medium flows through pipe system 100 to actuate the pistons of the dump hoists 41a and 41b. When the body has reached the desired height for dumping, the operator then opens valve 112 and this allows relief of liquid from the upper ends of cylinders 35a and 35b and the gate controlled thereby will be opened, due to the fact that its control valve 104 or 106 had previously been opened.

Should it be desired to dump the next load to the opposite side, the position of valves 104 and 106 would be reversed before applying the pressure medium to the dumping cylinders, and after the body had been raised, dumping would be incident to opening the valve 112.

In the constructions herein described, a feature resides in the use of the double acting hoists 41a and 41b. This provides for a positive control of the body. It can be elevated to any desired position and positively held while the gates are opened.

Also in the top hinging of the gates, to place them in the clear of the load after dumping, and in the positive control of the gates.

Having thus described my invention, what I claim as new therein and desire to secure by Letters Patent is—

1. A load hauling vehicle of the character described, comprising a wheel supported chassis, a body mounted by the chassis for dumping a load to either side, a gate for each side of the body, a means for actuating each gate, means movable to selectively govern the direction of dumping, devices operable under control of the said last means for automatically selectively actuating the gate toward which dumping is to take place, and means for actuating the body for dumping in either direction.

2. A device as in claim 1 wherein there is a control means common to the gate actuating means, the means for selective control of the direction of dumping and the body dumping means.

3. A load hauling vehicle of the character described, comprising a wheel mounted chassis, a body mounted by the chassis for dumping its load to either side and having supports at each side on which it normally rests and about which it may pivot when dumping to that side; said body being equipped with a gate at each side, means for selectively retaining the supports at either side of the body against lifting and for releasing those at the opposite side, means operable under control of the said selective means for selectively actuating the gates between open and closed positions, and means for actuating the body upwardly and pivotally about the retained supports to effect a dumping operation.

4. A load hauling vehicle of the character described, comprising a wheel mounted chassis, a body mounted on the chassis for dumping its load to either side, supports for the body at each side thereof on which it normally rests and about which it may pivot when dumping to that side, an outwardly and upwardly swinging gate for closing each side of the body, a hydraulic cylinder means on the body for actuating each of the gates from open to closed positions, a movable locking means for selectively releasing the supports at either side for lifting from the chassis and for functionally retaining the pivots at the opposite side connected with the chassis for a dumping operation, hydraulic means operable to lift the body for dumping in either direction, and means operable incident to selective disposition of the locking means for automatically opening the gate at the side toward which the load is to be dumped.

5. A vehicle of the character described comprising a wheel mounted chassis, a body supported on the chassis for dumping its load to either side, a gate for each side of the body, hydraulic cylinders for actuating the gates mounted on the body and having their piston rods operatively connected with the gates, a hydraulic cylinder on the chassis having its piston rod connected with the body for dumping in either direction, means for selectively releasing one side of the body for dumping and for retaining the opposite side against lifting incident to operation of the dumping cylinders, a hydraulic means for actuating said last mentioned means, a source of pressure medium, conduits connecting said source with the various cylinders, and a valve mechanism for controlling its application.

GEORGE S. ALLIN.